United States Patent
Konet

[11] 3,759,244
[45] Sept. 18, 1973

[54] VEHICLE HEATER
[75] Inventor: Henry Konet, Hohokus, N.J.
[73] Assignee: Neilford Leasing, Inc., Secaucus, N.J.
[22] Filed: May 11, 1971
[21] Appl. No.: 142,134

[52] U.S. Cl............ 126/110 R, 126/110 E, 431/255, 431/328, 431/37
[51] Int. Cl............................................. F24h 3/10
[58] Field of Search .................. 126/110 R, 110 E; 431/236, 237, 36, 255, 328, 37

[56] References Cited
UNITED STATES PATENTS

| | | | |
|---|---|---|---|
| 2,240,059 | 4/1941 | Thoresen | 431/36 |
| 3,620,205 | 11/1971 | Vial | 126/110 E |
| 1,536,583 | 5/1925 | Humphrey | 431/237 |
| 2,362,259 | 11/1944 | Findley | 126/110 E X |
| 3,150,656 | 9/1964 | Huber | 126/110 E |

Primary Examiner—William E. Wayner
Assistant Examiner—William E. Tapolcai, Jr.
Attorney—Shenier & O'Connor

[57] ABSTRACT

A self-contained automatic heater unit for a vehicle such as a truck trailer or the like in which a temperature sensor automatically ignites a pre-heater by means including a rechargeable power source to supply a mixture of hot air and fuel to a burner plate of large area the burners of which are ignited when the pre-heated mixture reaches a certain temperature and the products of combustion of which are first brought into contact with the hot junctions of a thermopile and then are passed through a heat exchanger to which air from the space to be heated is supplied by a fan which first moves this cool air past the cold junctions of the thermopile and then through the heat exchanger to the space to be heated and in which the voltage produced by the thermopile recharges the battery which provides a power source for the system.

2 Claims, 4 Drawing Figures

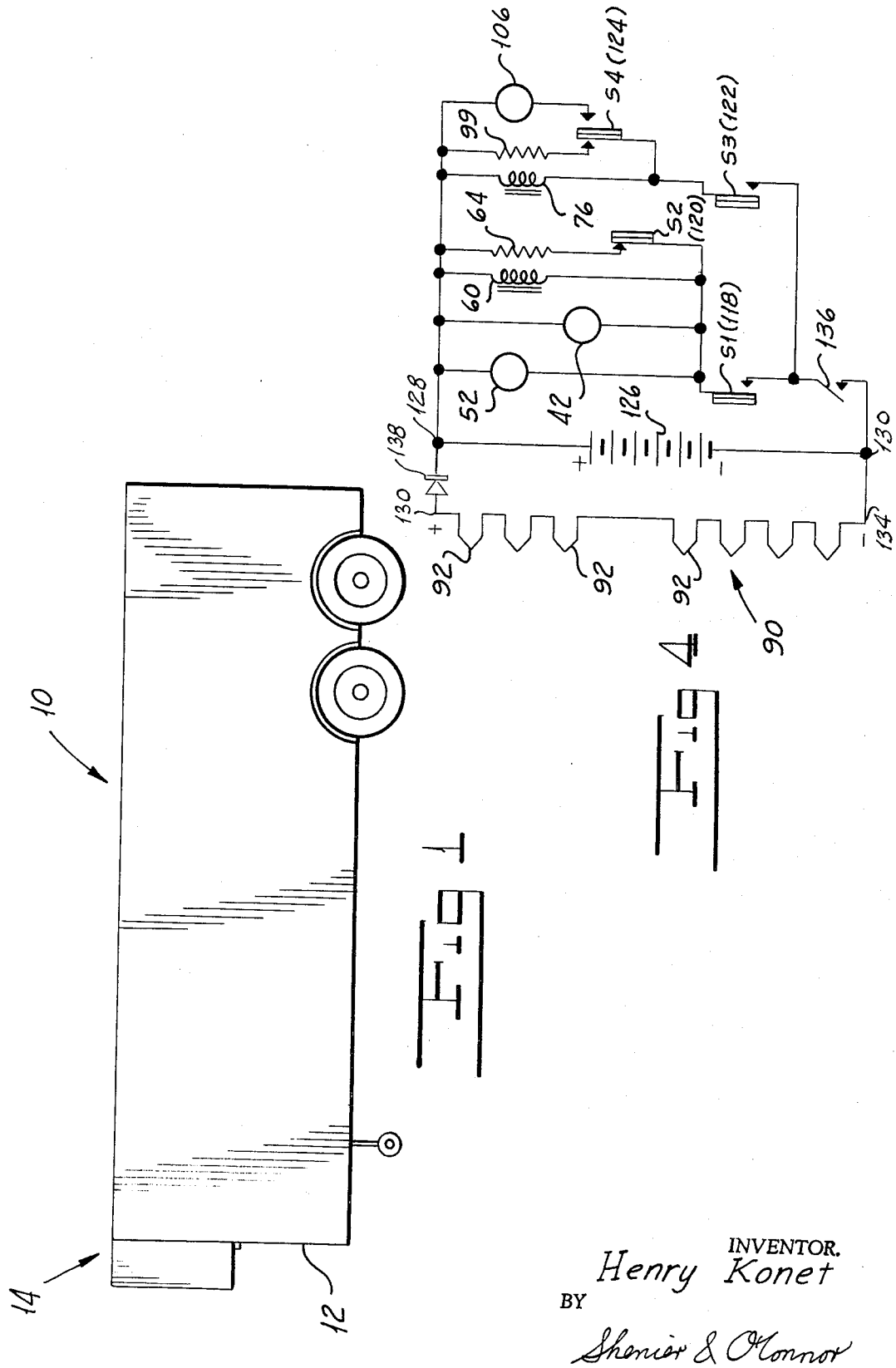

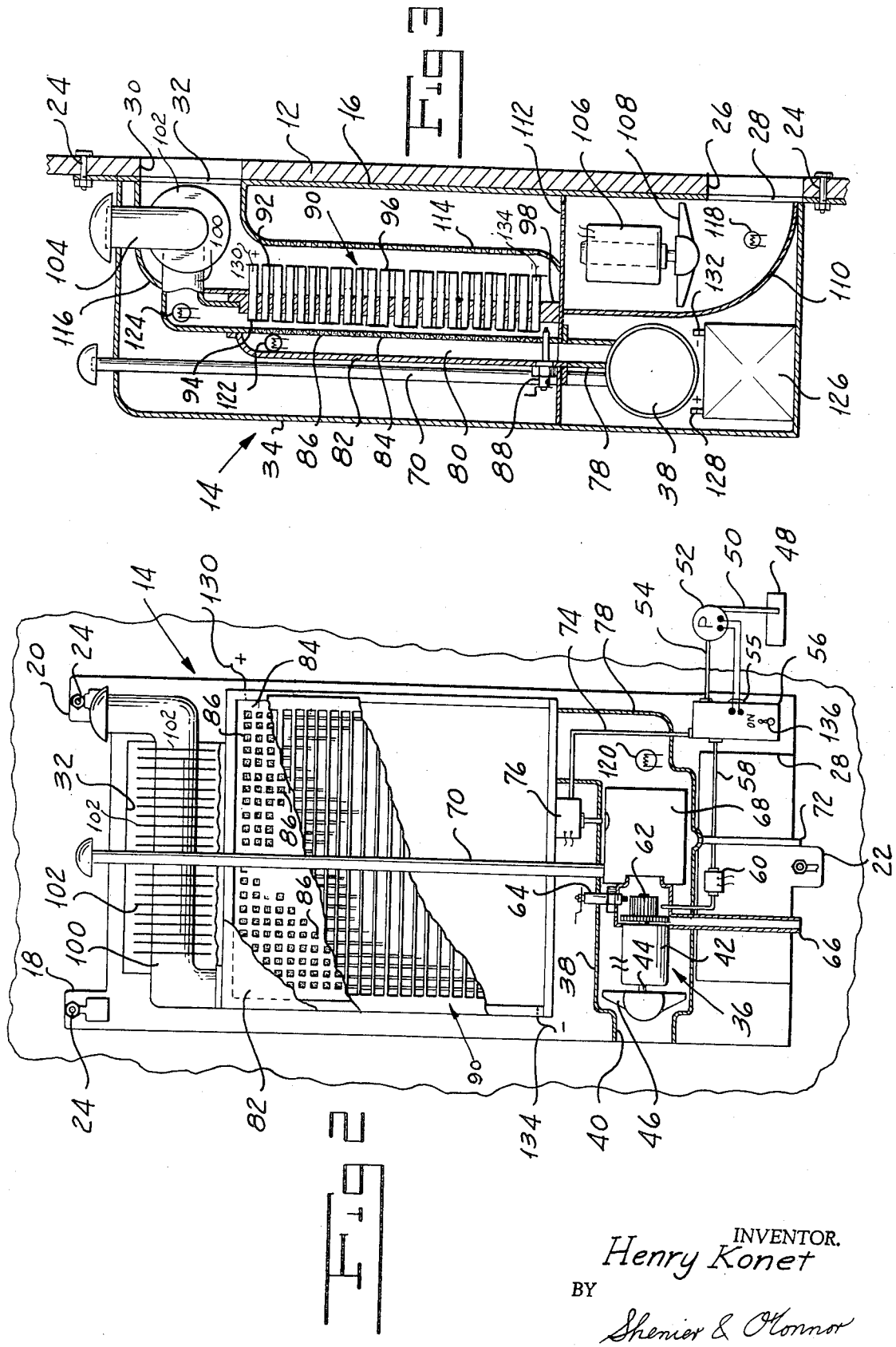

VEHICLE HEATER

BACKGROUND OF THE INVENTION

There are many instances in which cargo must be heated to prevent it from being damaged by cold during shipment or while stored in a vehicle which is awaiting routing. A particular example of a cargo carrier which requires such heating is a truck trailer. A heater for such a unit must be provided for each trailer. In the prior art various expedients have been resorted to in an effort to overcome the problem of damage to cargo by freezing. The simplest of these efforts of the prior art is the provision of stoves within the trailer or attached thereto so as to pipe heat into the space within the trailer. Heating units of this type are generally unsatisfactory since they require an inordinate amount of space and require relatively frequent attention. Other attempts in the prior art have been made to provide automatic devices for heating the interior of a trailer. Such devices of the prior art have the defect that they are not self-contained since they require electrical power from a separate source for ignition. Self-contained units such as gasoline engines for heating are relatively heavy, complex and inefficient. They require a considerable amount of maintenance and relatively frequent repair. In addition they require a relatively large number of batteries and sources of power from which the batteries can be recharged must be available at locations where recharging is required.

I have invented a heater for vehicles which overcomes the defects of heaters of the prior art pointed out hereinabove. My heater is entirely self-contained. It is automatic. It is portable. My heater is reliable and does not require any external power source. In operation my heater minimizes pollution as compared with heaters of the prior art. It has a long life.

SUMMARY OF THE INVENTION

One object of my invention is to provide a vehicle heater which overcomes the defects of vehicle heaters of the prior art.

Another object of my invention is to provide a vehicle heater which is self-contained.

A further object of my invention is to provide a vehicle heater which is reliable.

Still another object of my invention is to provide a vehicle heater which requires no external power source.

Yet another object of my invention is to provide a vehicle heater which is portable.

A still further object of my invention is to provide a vehicle heater which minimizes pollution of the atmosphere.

Other and further objects of my invention will appear from the following description.

In general my invention contemplates the provision of a vehicle heater in which a temperature sensor connected to a rechargeable power source and subject to the air in the surface to be heated automatically activates a preheater which supplies a mixture of heated air and atomized fuel to a burner plate of large area the burners of which are ignited when the preheated air reaches a certain temperature and the products of combustion of which first are brought into contact with the hot junctions of a thermopile the cold junctions of which are subjected to the air to be heated and then the hot products and the air to be heated are brought into indirect heat exchange relationship and the air is returned to the space. The output of the thermopile is used to recharge the source of power.

BRIEF DESCRIPTION OF THE DRAWING

In the accompanying drawings which form part of the instant specification and which are to be read in conjunction therewith and in which like reference numerals are used to indicate like parts in the various views:

FIG. 1 is a side elevation of a vehicle such as a truck trailer provided with my vehicle heater.

FIG. 2 is a front elevation of my vehicle heater with the cover removed, with some parts broken away and with other parts shown in section.

FIG. 3 is a sectional view of my vehicle heater.

FIG. 4 is a schematic view of one form of electrical circuit which may be used to control the operation of my heater.

DESCRIPTION OF THE PREFERRED EMBODIMENT

Referring now to the drawings I have shown a vehicle such for example as a truck trailer indicated generally by the reference character 10 having a front wall 12 on which I mount my vehicle heater indicated generally by the reference character 14. The heater unit 14 includes a mounting plate or base 16 provided with respective hangers 18, 20 and 22 for receiving bolts 24 or the like extending through the wall 12 removably to mount the unit on the front wall 12 of the trailer 10.

I form the wall 12 with an air inlet opening 26 which registers with an opening 28 in the base 16 to admit air to be heated into the unit 14. Wall 12 also has a heated air outlet 30 which registers with an opening 32 in the base 16 to permit air heated by the unit to flow back into the trailer 10.

My unit 14 includes a pre-heater system indicated generally by the reference character 36 located within a housing 38 extending from an opening 40 in the side of the unit from left to right as viewed in FIG. 2. The preheater unit 36 includes a motor 42 adapted to be energized in a manner to be described to drive a shaft 44, one end of which carries a fan 46 for moving air into the housing 38 through the opening 40.

A pump 52 located on the trailer 10 outside the unit 14 is adapted to take fuel of any suitable type from a tank 48 through a line 50 and to supply fuel to the unit through a line 54. My unit is capable of using any readily available fuel such for example as diesel oil which may be taken from the tank of the tractor to which the trailer 10 is coupled. Both the line 54 and electrical plug 55 for motor 52 may be releasably connected to the control unit 56 of the heater 14.

The unit 56 is adapted to contain all of the electronic circuitry required to control the unit and to be described hereinafter. In addition, fuel supplied to the control unit 56 by line 54 is conveyed by a line 58 to a control valve 60 which is adapted to permit the fuel to flow to an atomizer 62 carried by the shaft 44 of motor 42. As will be described more fully hereinafter, when the temperature of air within the trailer 10 reaches a predetermined low motor 42 is energized and a glow plug 64 is energized to ignite the fuel atomized by the atomizer 62. Preferably I provide the preheater unit with an outlet 66 adapted to permit excess fuel, if any, to flow out of the preheater.

The preheater unit 36 causes hot air to be supplied to a heat exchanger and vaporizer 68. A line 70 is adapted to convey exhaust gases from the preheater unit 36 to the atmosphere. I provide housing 38 with a drip line 72 for eliminating any excess oil from the vaporizer 68. Fuel from line 54 supplied to the control unit 56 also is conducted by a line 74 to a solenoid-operated valve and flow control unit 76 adapted to supply fuel to the vaporizer and heat exchanger 68, which may be of any suitable type known to the art.

A mixture of vaporized fuel and hot air from the unit 68 is conveyed into the space 80 between a cover plate 82 and a burner plate 84 of relatively extended area. The mixture of vaporized fuel and hot air passes through a plurality of porous burners 86 in the plate 84 and when the temperature of the mixture reaches a predetermined point a glow plug 88 is activated to ignite the fuel in a manner to be described.

I position a thermopile 90 made up of a plurality of series-connected thermocouples 92 in a wall 98 of insulating material with the hot junctions 94 of the thermocouples on one side of wall 98 adjacent to the burner plate 84 and with the cold junctions 96 on the other side of wall 98. The thermocouples 92 making up thermopile 90 may be made up of any suitable thermoelectric materials known to the art. One specific combination I have used is "Nichrome," which is the registered trademark of Driver-Harris Company of Harrison, N.J. for an alloy of 60% nickel, 24% iron, 16% chromium and 0.1% carbon, and constantan, which, as is known in the art, is an alloy of 55% copper and 45% nickel. From the hot junctions 94 of the thermocouples 92 the products of combustion from burner plate 84 pass upwardly and into a heat exchanger pipe 100 provided with a plurality of fins 102. From the pipe 100 the hot gases pass outwardly through an exhaust pipe or flue 104.

A cold air fan motor 106 is adapted to be energized in a manner to be described at the same time as that at which the burners of plate 84 are lit. Motor 106 drives a fan 108 to draw air from inside the vehicle through openings 26 and 28 and into a duct 110. From the duct 110 the air passes upwardly through a perforated partition 112 toward a distributor plate 114. Plate 114 is provided with a plurality of perforations over the area of the thermopile 90 to distribute the relatively cool air evenly over the cold junctions 96 of the thermopile 90. From the cold junctions this air passes upwardly to a duct 116 surrounding the heat exchanger to bring the cool air into contact with the surfaces of the fins 102 on pipe 100. In this manner the air is heated and then passes outwardly through openings 30 and 32 and into the interior of the trailer 10.

A first thermo-element 118 senses the temperature of the air within the vehicle adjacent the opening 26 to initiate operation of the heater 14 in a manner to be described. A second thermoelement 120 located at the outlet of the heat exchanger 68 senses that the preheater has been ignited to extinguish the glow plug 64. A third thermoelement 122 located adjacent the top of the space 80 senses the temperature of the preheated air and vaporized fuel mixture to initiate operation of the main heater by igniting plug 88 when the mixture reaches a predetermined temperature. A fourth thermoelement 124 senses the temperature of exhaust gases from the main burner to extinguish the glow plug 88 upon ignition of the main burner.

The source of power for my heater is a storage battery 126 having a positive terminal 128 connected to the positive terminal 130 of the thermopile 90 and having a negative terminal 132 connected to the negative terminal 134 of the thermopile 90. An on-off switch 136 on the control unit 56 is adapted to be actuated to set the unit for operation.

Referring now to FIG. 4 I have illustrated one form of electrical circuit which may be employed to control my heater. I connect the thermopile 90 across the battery 126 with a rectifier 138 between the two positive terminals. When the on-off switch 136 is closed a circuit is complete between the positive battery terminal and a normally open thermoswitch S1 adapted to be closed by sensor 118. When the temperature reaches a predetermined low point S1 closes to complete a circuit for motor 52, for motor 42, for the solenoid of valve 60 and for the glow plug 64 through a second normally closed thermoswitch S2 which is opened by sensing element 120. Once the temperature of the preheated mixture reaches a set point another normally open thermoswitch S3 is closed by sensor 122 to complete a circuit for the solenoid of valve 76 and for glow plug 99 through a thermoswitch S4 which normally engages a contact connected to the glow plug 99. When the temperature of the exhaust gases of the main heater reaches a predetermined point element 124 actuates switch S4 to deenergize the plug 99 and to energize motor 106.

The operation of my heater will readily be understood from the description hereinabove. With the on switch 136 closed when the temperature of the air within the trailer 10 reaches a predetermined low point pump motor 52 is energized to supply fuel through controller 56 to lines 58 and 74. At the same time, valve and flow controller 60 is energized to supply fuel to atomizer 62. Motor 42 is energized to draw air in through the inlet 40 and to drive the atomizer 62. Glow plug 64 is energized to ignite the preheater and preheated air is supplied to the atomizer and heat exchanger 68. Element 120 senses the action of the preheater and extinguishes plug 64. When the preheated air reaches a predetermined temperature element 122 operates valve and flow controller 76 to supply fuel to the atomizer and heat exchanger 68 and it energizes glow plug 88 to light the main burner. When the main burner is lit element 124 extinguishes plug 88 and energizes motor 106 to cause air from inside the vehicle to be drawn into duct 110.

Hot products of combustion from the burner plate 84 first impinge upon the hot junctions 94 of the thermocouples 92 and then pass upwardly through the heat exchanger pipe 100 and out through flue 104. The cold air drawn into duct 110 from the interior of the vehicle travel upwardly and through the perforations in the plate 114 into contact with the cold junctions 96 of the thermocouples 92. After leaving the thermopile 90 the cold air comes into heat exchange relationship with the fins 102 and is heated and passed into the trailer 10. The voltage generated by the thermopile 90 is applied to the battery 126 to recharge the same.

It will be seen that I have accomplished the objects of my invention. I have provided a heater for a vehicle such as a truck trailer which is self-contained in that it requires no external power source. It uses fuel from a readily available supply. It requires very little maintenance. No recharging from an external power source is required. It is compact and is relatively light. It may easily be attached to and removed from the vehicle with which it is used.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A self-contained heater unit for heating the air within a space including in combination, a housing having an inlet and an outlet communicating with said space, an indirect heat exchanger in said housing, a thermoelectric generator comprising a plurality of thermocouples each having a hot junction and a cold junction and means mounting said thermocouples in said housing with said junction distributed over extended areas, a main burner plate comprising a plurality of burners in said housing distributed over an area adjacent to the hot junction area, a preheater, means including said preheater for supplying a mixture of preheated air and fuel to said main burner plate, a rechargeable source of power, means for sensing the temperature of the air within said space, means including said means for sensing the temperature of air within said space for connecting said source to said preheater to activate said preheater, means responsive to the temperature of said mixture for igniting fuel supplied to said burner plate to cause said burners to produce hot products of combustion, means for passing said hot products of combustion over said hot junctions and to said indirect heat exchanger, means for passing air from said space successively over said cold junctions and to said indirect heat exchanger and back to said space, said thermopile producing a voltage in response to the temperatures of said hot products and said air, and means for applying said voltage to said source of power to recharge the same, said preheater comprising a blower, means adapted to be energized to supply fuel to said preheater and means for igniting said fuel supplied to the preheater, said means responsive to the means for sensing temperature of said air in said space comprising means for connecting said blower and said fuel supply means and said igniting means to said source.

2. A self-contained heater unit for heating the air within a space including in combination, a housing having an inlet and an outlet communicating with said space, an indirect heat exchanger in said housing, a thermoelectric generator comprising a plurality of thermocouples each having a hot junction and a cold junction and means mounting said thermocouples in said housing with said junctions distributed over extended areas, a main burner plate comprising a plurality of burners in said housing distributed over an area adjacent to the hot junction area, a preheater, means including said preheater for supplying a mixture of preheated air and fuel to said main burner plate, a rechargeable source of power, means for sensing the temperature of the air within said space, means including said means for sensing the temperature of air within said space for connecting said source to said preheater to activate said preheater, means responsive to the temperature of said mixture for igniting fuel supplied to said burner plate to cause said burners to produce hot products of combustion, means for passing said hot products of combustion over said hot junctions and to said indirect heat exchanger, means for passing air from said space successively over said cold junctions and to said indirect heat exchanger and back to said space, said thermopile producing a voltage in response to the temperatures of said hot products and said air, and means for applying said voltage to said source of power to recharge the same, said preheater comprising a first blower, means adapted to be energized to supply fuel to said preheater and means for igniting said fuel supplied to said preheater, said mixture supplying means comprising a heat exchanger and fuel vaporizer adapted to receive air from said first blower and the hot products of combustion from said preheater and means for supplying fuel to the vaporizer, said means for passing air to be heated including a second blower, said means responsive to the means for sensing the temperature of air in said space including means for concomitantly connecting said first blower and said preheater fuel supply means and said preheater fuel igniting means to said power source, said unit including means responsive to ignition of said preheater fuel for disconnecting said preheater fuel igniter from said source, said means for igniting said mixture fuel including means for actuating said vaporizer fuel supply means, said unit including means responsive to ignition of said mixture fuel for concomitantly deenergizing said mixture fuel igniting means and energizing said second blower.

* * * * *